United States Patent
Shimazaki

[11] Patent Number: 6,052,523
[45] Date of Patent: Apr. 18, 2000

[54] METHOD OF TRANSIENT ANALYSIS CONSIDERING TIME STEPS AND A DEVICE FOR IMPLEMENTING THE METHOD

[75] Inventor: Mutsumi Shimazaki, Tokyo, Japan

[73] Assignee: Mitsubshiki Denki Kabushiki Kaisha, Tokyo, Japan

[21] Appl. No.: 08/905,541

[22] Filed: Aug. 4, 1997

[30] Foreign Application Priority Data

Mar. 25, 1997 [JP] Japan ................................. 9-072287

[51] Int. Cl.⁷ ........................................ G06F 19/00
[52] U.S. Cl. .............................. 395/500.38; 395/500.34; 395/500.4
[58] Field of Search ................ 395/500.34, 500.38, 395/500.4

[56] References Cited

U.S. PATENT DOCUMENTS

| | | | |
|---|---|---|---|
| 5,517,585 | 5/1996 | Dowling | 382/291 |
| 5,566,085 | 10/1996 | Marceau et al. | 364/492 |
| 5,758,277 | 5/1998 | Hawkes | 455/410 |
| 5,799,114 | 5/1993 | Dowling | 382/291 |

FOREIGN PATENT DOCUMENTS 6-83897 3/1994 Japan .
7-129637 5/1995 Japan .

OTHER PUBLICATIONS

List of Technical Memoranda, *Technical Memoranda*, Electronics Research Laboratory.

*Primary Examiner*—Kevin J. Teska
*Assistant Examiner*—Kyle J. Choi
*Attorney, Agent, or Firm*—Burns, Doane, Swecker & Mathis, LLP

[57] ABSTRACT

Upon a transient analysis simulation, if a time step between calculation points is relatively small, a forced quit error occurs, which leads to deterioration of development efficiency. A voltage $v_n$ at a calculation point $t_n$ is obtained by solving a circuit equation. A change rate in the voltage $v_n$ in a step $[t_{n-1}, t_n]$ is assumed to be maintained in another step $[t_n, t_{n+1}]$, and a calculation point $t_{n+1}$ is temporarily determined so that $v_{n+1}-v_n$ is equal to a predetermined value $\Delta v$. The step $t_{n+1}-t_n$ is then judged if it falls within a dynamic range of a computer. If the step does not fall within the dynamic range, the calculation point $t_n$ is moved backward by a predetermined decrement, and the procedure is re-performed. If $t_{n+1}-t_n$ falls within the dynamic range, a voltage at the calculation point $t_{n+1}$ is calculated.

16 Claims, 4 Drawing Sheets

METHOD OF TRANSIENT ANALYSIS CONSIDERING TIME STEPS AND A DEVICE FOR IMPLEMENTING THE METHOD

BACKGROUND OF THE INVENTION

1. Field of the Invention

The present invention relates to a method of transient analysis considering time steps and a device for implementing the method.

2. Description of the Related Art

Due to great improvement of computer hardware and refined transient analysis simulation software, considerable labor saving has been achieved in the field of circuit design which was conventionally performed only through experimental trial and error. A simulator of electric or electronic circuits has circuits comprising transistors, resistors, capacitors, inductors, and the like as a target of analysis, and traces behavior of circuit voltages and currents using a numerical analysis method such as the Newton method, logically based on Kirchhoff's and Ohm's laws.

Recently, SPICE2 (University of California Berkley, Memo No. ERL-M520, May 1975) has been well known as a transient analysis simulator. When SPICE2 analyzes a voltage changing with time, it follows the following procedure.

First, reference values $\Delta t$ to maintain accuracy and $\Delta v$ to advance a calculation point are set. Then a rate of change $dv/dt$ in the voltage $v_n$ at an nth calculation point $t_n$ on a time axis is obtained. Based on this $dv/dt$, a next calculation point $t_{n+1}$ is predicted linearly so that a voltage $v_{n+1}$ at the next calculation point $t_{n+1}$ satisfies $v_{n+1}-v_n=\Delta v$. Calculation of $v_{n+1}$ at this stage is performed roughly by a known approximation equation such as trapezoid method or Gear method. After the calculation point moves to $t_{n+1}$, a non-linear circuit voltage equation is solved by the Newton method or the like, and $v_{n+1}$ is obtained precisely. If $t_{n+1}-t_n>\Delta t$, calculation points are controlled by setting $t_{n+1}=t_n+\Delta t$ in order not to over-advance, thereby maintaining precision of calculation. By predicting a next calculation point based on $\Delta v$, it is possible to trace the voltage precisely at more calculation points when the change rate in voltage is high. Contrarily, it is also possible to shorten time necessary for calculation by advancing the calculation points to some degree when the change rate is low.

To trace changes in voltage, another method by considering voltage which is input to a circuit to be analyzed is also known. In this method, in conjunction with the above-mentioned $\Delta v$, a reference voltage $\Delta v_I$ for the input voltage is also provided. A new calculation point is set when the input voltage changes exactly by $\Delta v_I$. When input voltage changes greatly, a comparatively big change in output voltage tends to follow. Therefore, this method contributes to accurate calculation of voltage. In Japanese Patent Laid-Open Publication Hei6-83897, a method to improve the conventional method of considering input voltage as well as output voltage is disclosed. This method is based on the fact that no calculation points need to be set when the input voltage changes by $\Delta v_I$ and the change rate remains constant. In this method, calculation points are set when the change rate in input voltage, and not a change in the input voltage, reaches a certain value. In this way, the number of calculation points is reduced and calculation time is shortened.

Regarding the transient analysis simulation, as described above, a plurality of proposals to shorten calculation time while maintaining calculation accuracy have been proposed. Methods to reduce errors in simulation are included in the proposals to shorten calculation time. For example, some proposals have been made to eliminate divergent circuit equation solutions.

However, other problems exist when SPICE2 is actually used. One problem is that simulations often forcibly quit halfway due to an error regarding a time interval (also called a time step) of calculation points. This error (hereafter, called "forced quit error") occurs upon prediction of the calculation point $t_{n+1}$ based on the calculation point $t_n$, if the time interval $(t_{n+1}-t_n)$ is remarkably different from the reference value $\Delta t$ for keeping accuracy. Time parameters such as $t_n$ are usually defined as variables of floating decimal point. Therefore, a domain of the variable of this kind is decided so that the upper bound of the domain has several more digits and the lower bound has several less digits than a typical $\Delta t$. The domain thus decided is capable of being treated by a computer, and sometimes called a "dynamic range" of a computer. When the voltage changes rapidly, in other words, $dv/dt$ grows very large, the time step $(t_{n+1}-t_n)$ becomes extremely small, and moves out of the lower bound of the dynamic range. On the other hand, even when $dv/dt$ is not very large, setting $\Delta t$ larger to shorten calculation time may result in the same phenomenon because the time step $(t_{n+1}-t_n)$ becomes too small relative to $\Delta t$.

In each case, elapsed simulation time is wasted, since the simulation was forcibly quit halfway. It is up to an operator's experience, to some degree, to decide how to change parameters to avoid errors. If $\Delta t$ is set small so as to avoid error, simulations require a long time. Up to the present, forced quit errors lead to deterioration in development efficiency without an effective countermeasure. Japanese Patent Laid-Open Publication Hei6-83897 does not consider the dynamic range of a computer.

SUMMARY OF THE INVENTION

The present invention is created taking these problems into consideration. The object of the present invention is to provide an easy transient analysis method and device, without unnecessary extension of calculation time, while maintaining calculation accuracy and avoiding forced quit errors.

One aspect of the present invention related to transient analysis is a method to calculate predetermined variables at a plurality of calculation points on a time axis. In the present invention, one calculation point following another calculation point is assumed based on behavior of a variable. If a time step between these calculation points steps out of a domain treatable by a computer, adjustment of calculation points which were previously set is performed and recalculation of the variable is then performed. In this method, a variable is recalculated when a trouble may actually occur. Therefore, it is not necessary to set a very high calculation accuracy in advance, and forced quit errors are easily avoidable.

In another aspect of the transient analysis method of the present invention, a value of a predetermined variable is first calculated at a calculation point $t_n$ on a time axis. The next calculation point $t_{n+1}$ is then assumed using a prediction of a change in the variable based on the value of the variable calculated at calculation points prior to $t_n$. It is then judged whether or not a time step $(t_{n+1}-t_n)$ between calculation points $t_{n+1}$ and $t_n$ falls within a domain treatable by a computer. If the time step is judged to not fall within the domain, calculation points which were previously set are adjusted. When adjustment of calculation points is performed, each step described above is executed again, and a value of the variable at the calculation point $t_{n+1}$ is calculated. In this aspect, it is not necessary to set high calculation accuracy in order to avoid forced quit errors, and calculation time is not greatly extended.

One aspect of the present invention related to a transient analysis device comprises:

a section for calculating a value of a predetermined variable at a calculation time $t_n$;

a section for assuming a position of a calculation point $t_{n+1}$ following the calculation point $t_n$ using prediction of a change in the variable based on the values of the variable calculated at $t_n$ and prior calculation points;

a section for judging if a time step between the calculation points $t_{n+1}$ and $t_n$ falls within a domain treatable by a computer; and a section for adjusting calculation points which were previously set, when the time step is judged not to fall within the domain. This device performs the procedure at each section described above after calculation points are adjusted. The device then calculates a value of the variable at the calculation point $t_{n+1}$ using the calculating section. With this device, effects of the above-described transient analysis method can be implemented.

DESCRIPTION OF THE PREFERRED EMBODIMENT

Figure 1:
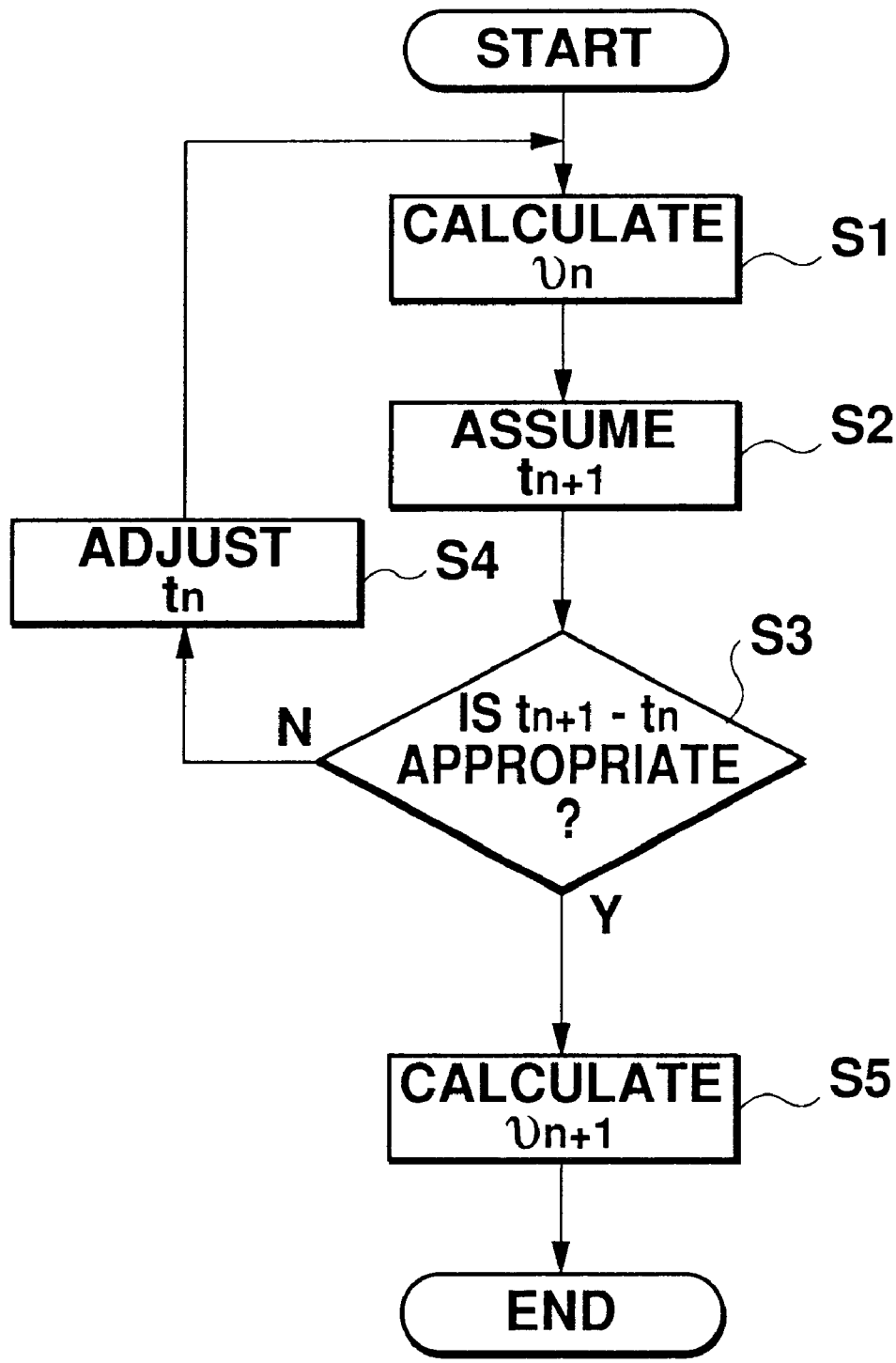
FIG. 1 is a flow-chart showing an outline of procedure by a transient analysis method related to the present embodiment.

A preferred embodiment of the present invention will now be explained referring to the figures. FIG. 1 is a flow-chart showing a procedural outline of a transient analysis method related to the present embodiment. The entire procedure will briefly be explained first referring to FIG. 1, and details will be described later in conjunction with hardware configuration. An analysis of a voltage $v_i$ at a certain location in an electric circuit at a calculation time $t_i$ ($i=0,1,\ldots$) on a time axis is taken as an example here, any variable can be used instead of the voltage, however. It is assumed that a reference value $\Delta t$ for maintaining calculation accuracy and a reference value $\Delta v$ for advancing calculation points are set before analysis.

As shown in FIG. 1, in this transient analysis method, a voltage $v_n$ at a calculation point $t_n$ is obtained by solving a circuit equation or the like (S1). Based on the $v_n$ now obtained and $v_{n-1}$ previously calculated, a position of a next calculation point $t_{n+1}$ is assumed (S2). At this step, a change rate in the voltage at a period $[t_{n-1}, t_n]$ is for example calculated using $v_{n-1}$ and $v_n$, and it is then assumed that this change rate is constant at a period $[t_n, t_{n+1}]$. Based on this assumption, the position of the calculation point $t_{n+1}$ is assumed using an approximation equation so that $v_{+1}-v_n$ is equal to $\Delta v$.

It is then judged whether a time step ($t_{n+1}-t_n$) between the calculation points $t_{n+1}$ and $t_n$ is appropriate. In other words, it is judged whether the time step falls within a domain treatable by a computer (i.e., a dynamic range) (S3). This time step is determined using a several digit margin around $\Delta t$. Therefore, a number of digits the time step needs is changeable depending on $\Delta t$. For example, if $\Delta t$ is set in an order of $10^{-9}$ second (i.e., nanosecond), the dynamic range for the time step may be $10^{-12}$–$10^{-6}$ second. On the other hand, if the change rate in v is high, ($t_{n+1}-t_n$) becomes $10^{-20}$ second, for example, which steps out of the dynamic range. At S3, if the time step ($t_{n+1}-t_n$) falls within this range at the time of $t_{n+1}$ which was assumed at S2, it is judged to be appropriate, while the step is judged to be not appropriate if otherwise.

If the time step is judged to be not appropriate at step S3, the procedure goes on to S4. At S4, the position of the calculation point $t_n$ is adjusted. The calculation point $t_n$ is now moved backward by a predetermined decrement (hereafter called α), and the new $t_n$ is plugged in for the calculation at step S1. α can be adopted from the lower bound of the dynamic range or from ($t_{n+1}-t_n$)/k, with k being a natural number. If α is positive, the calculation point $t_n$ is moved toward $t_{n-1}$. When the time step is judged to be inappropriate, at step S3, the voltage v is expected to change greatly at a period $[t_n, t_{n+1}]$. Therefore, it is preferable to cancel the inappropriate condition before the time enters the period $[t_n, t_{n+1}]$. It is because a period of great change should be analyzed in detail as early within the period as possible, after moving to an appropriate status to continue calculation. Based on this idea, α is set to be positive and the calculation point is moved backward. After the calculation point $t_n$ was moved backward, i.e., after the calculation point was moved to $t_n'=t_n-\alpha$, a new voltage $v_n'$ is calculated at this new calculation point $t_n'$ (S1), and the procedure after S1 is repeated. Once the time step is judged to be appropriate at S3, the procedure goes on to S5.

At step S5, a voltage $v_{n+1}$ is calculated at the assumed calculation point $t_{n+1}$, by solving a circuit equation or the like. As described above, the voltage $v_{n+1}$ is determined and the procedure ends. When an analysis at a following calculation point $t_{n+2}$ is performed, the procedure depicted in FIG. 1 is performed from the start, with n being replaced by n+1.

Figure 2:
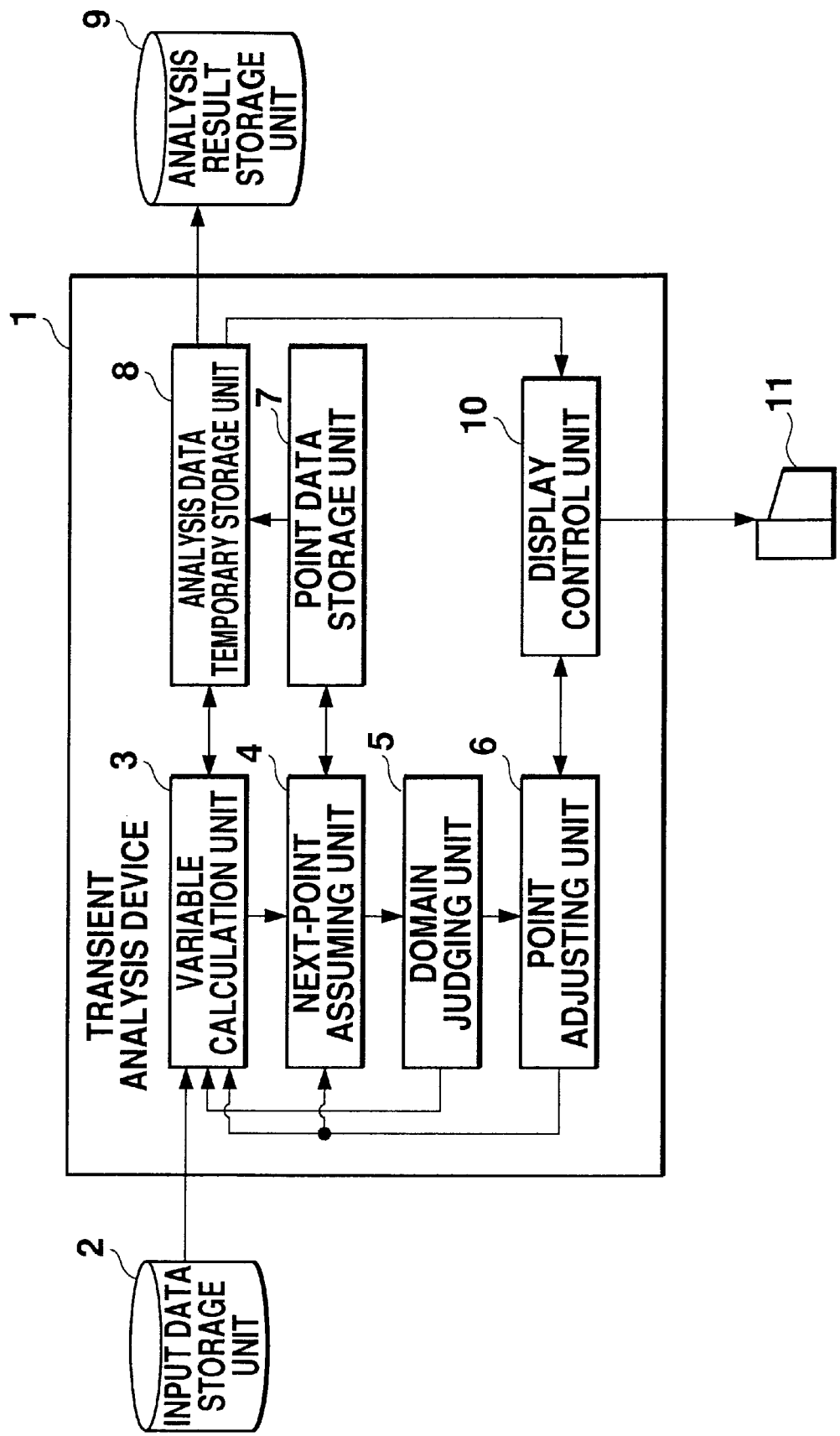
FIG. 2 is a block diagram showing a configuration of a transient analysis device related to the present embodiment.

FIG. 2 is a block diagram showing a configuration of a transient analysis device related to the present embodiment. As shown in FIG. 2, the transient analysis device 1 has a variable calculation unit 3 which obtains, from an input data storage unit 2, circuit information or circuit element information which are necessary for the analysis. The variable calculation unit 3 calculates voltage $v_i$ at each calculation point by solving a circuit equation. The voltage $v_i$ is supplied to both a next-point assuming unit 4 and an analysis data temporary storage unit 8. The next-point assuming unit 4 assumes the position of a calculation point $t_{n+1}$ based on the voltage $v_i$, especially on voltages $v_{n-1}$ and $v_n$. The assumed position of the calculation point $t_{n+1}$ is then supplied to both a domain judging unit 5 and a point data storage unit 7.

The domain judging unit 5 judges whether the time step ($t_{n+1}-t_n$) is appropriate. If it is appropriate, then the domain judging unit 5 notifies the variable calculation unit 3 of the appropriatness. The variable calculation unit 3 calculates the voltage $v_{n+1}$ corresponding to the calculation point $t_{n+1}$. If the time step is not appropriate, the domain judging unit 5 notifies a point adjusting unit 6 of this fact. The point adjusting unit 6 moves the calculation point $t_n$ backward by α, and notifies both the variable calculation unit 3 and the next point assuming unit 4 of the new calculation point $t_n'$. The variable calculation unit 3 calculates $v_n'$ at the calculation point $t_n'$, and supplies the value of $v_n'$ to both the next-point assuming unit 4 and the analysis data temporary storage unit 8. The next point assuming unit 4 assumes the position of a new calculation point $t_{n+1}'$, based on the position of the calculation point $t_n'$ given by the point adjusting unit 6 and the voltage $v_n'$ given by the variable calculation unit 3. The position of the assumed calculation point $t_{n+1}'$ is supplied to both the domain judging unit 5 and the point data storage unit 7.

The point data storage unit 7 holds data about positions of calculation point $t_i$ which appears during the process, and outputs the data to the analysis data temporary storage unit 8. The analysis data temporary storage unit 8 has voltage $v_i$ in a buffer. Therefore, the analysis data temporary storage unit 8 holds both the received data about the position of calculation point $t_i$ and voltage $v_i$, and waits for the end of analysis. Once the analysis is finished, the analysis data temporary storage unit 8 supplies both the received data about the position of calculation point $t_i$ and voltage $v_i$ to an analysis result storage unit 9.

When the point adjusting unit 6 adjusts positions of calculation points, it notifies a display control unit 10 of the adjustment. The display control unit 10 displays on a display 11, during or at the end of the analysis, a message such as "During analysis, a time step for calculation was out of the computer's dynamic range. At t=*, the calculation point was moved backward by *, and the calculation was continued." The display control unit 10 is also given the data about the position of the calculation point $t_i$ as well as the voltage $v_i$ by the analysis data temporary storage unit 8. Therefore, data during the analysis can also be displayed in real time on the display 11. Other output devices such as a printer (not shown in FIG. 2) or the like can be used.

Figure 3:
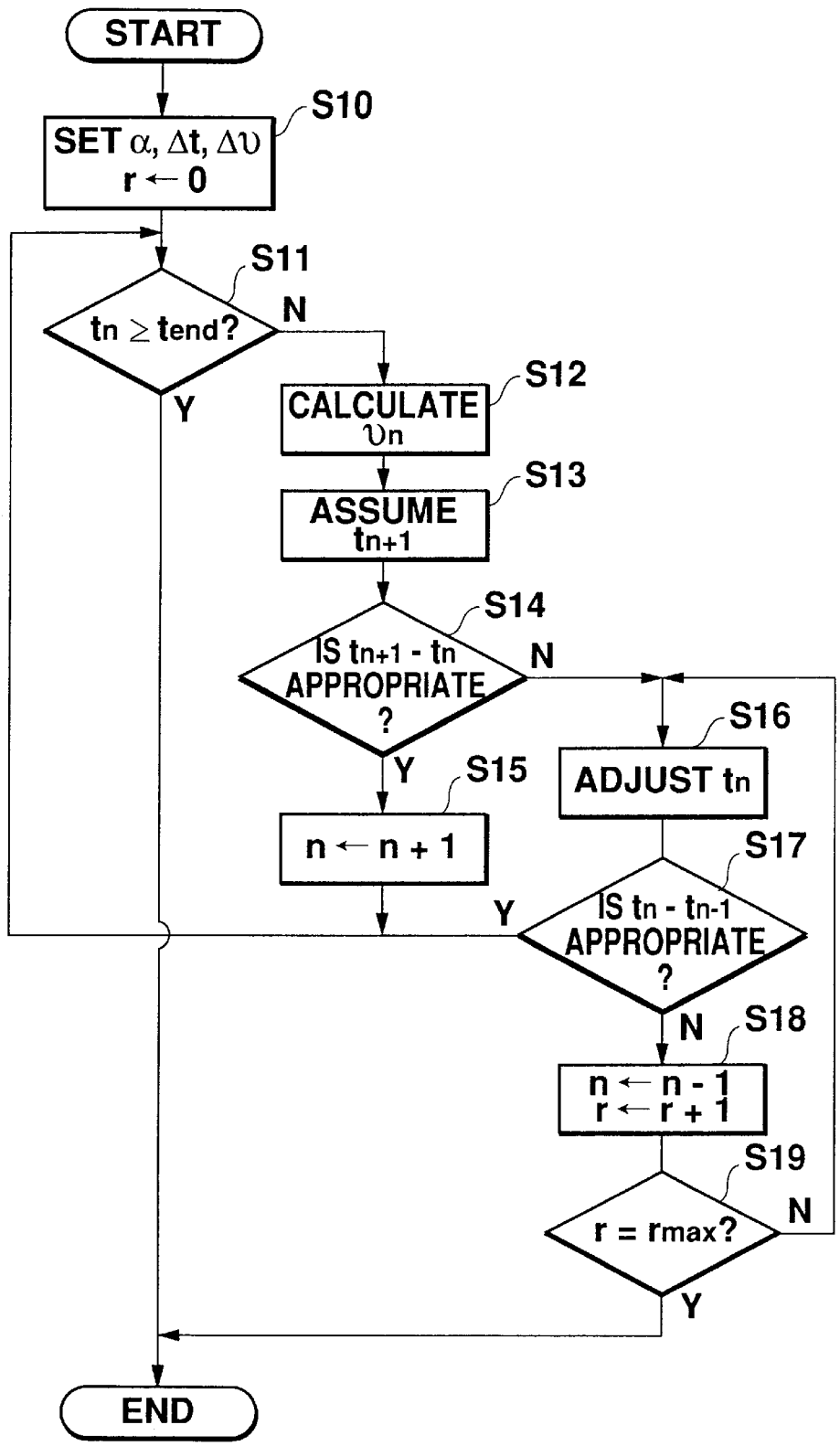
FIG. 3 is a flow-chart showing analysis actions using the configuration depicted in FIG. 2.
Figure 4:
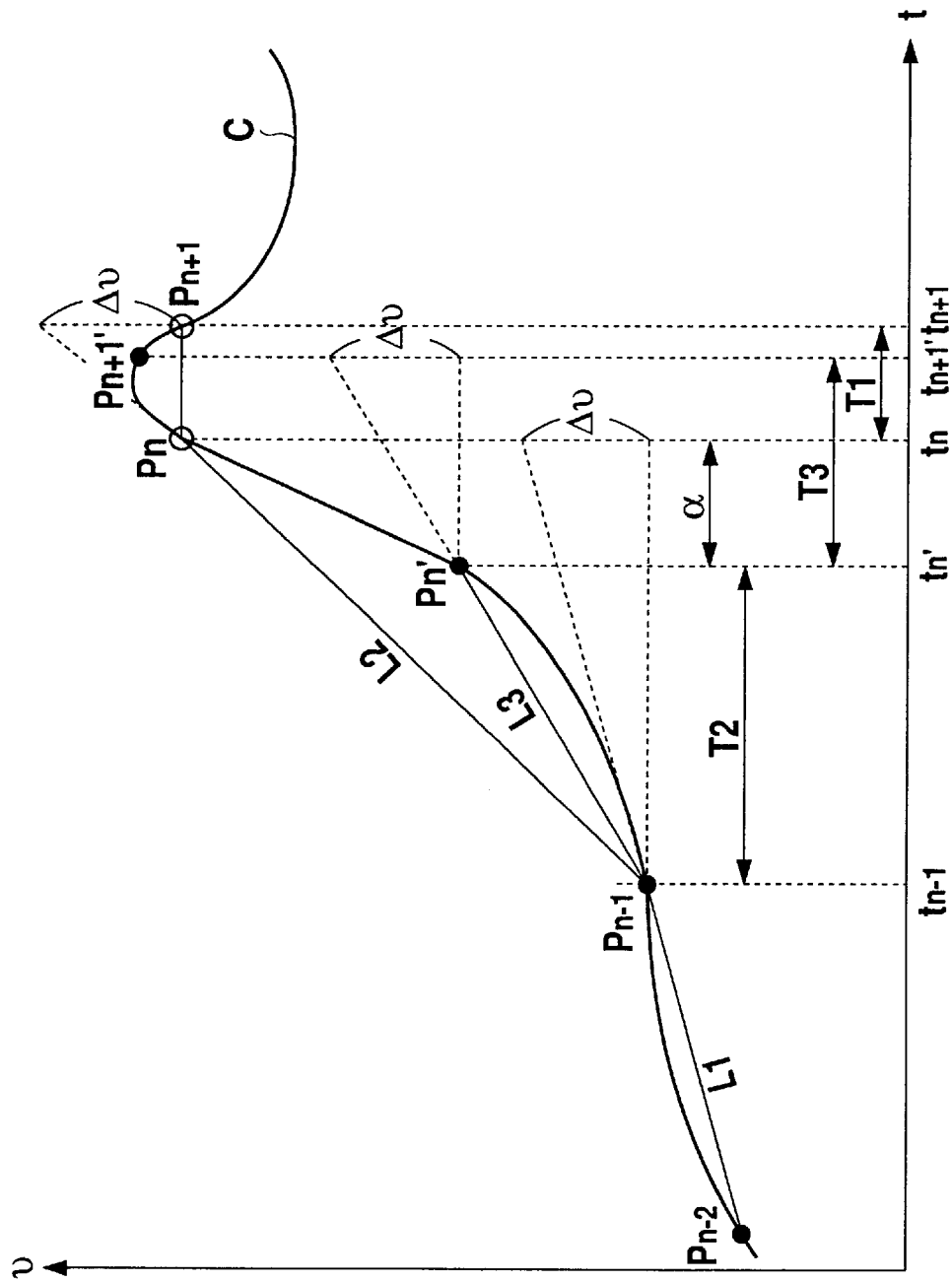
FIG. 4 is a diagram showing the detailed analysis actions depicted in FIG. 3, using a waveform of a voltage.

FIG. 3 is a flow-chart showing analysis actions using the configuration as described above. FIG. 4 shows detailed analysis actions using a waveform of a voltage. The analysis procedure depicted in FIG. 3 is considered to be a detailed example of the procedure depicted in FIG. 1. The waveform C in FIG. 4 shows an actual voltage behavior. However, in the analysis, the entire waveform as depicted by C is not determined. A sporadic voltage at each calculation point is determined instead. Points $P_{n-2}$, $P_{n-1}$, $P_n$, $P_{n+1}$, $P_n'$ and $P_{n+1}'$ on the waveform C are respectively corresponding to calculation points $t_{n-2}$, $t_{n-1}$, $t_n$, $t_{n+1}$, $t_n'$ and $t_{n+1}'$. In FIG. 4, a problem occurred when the calculation point advanced from $t_n$ to $t_{n+1}$. Therefore, $t_n$ is moved backward by α, and a new calculation point $t_n'$ is positioned. Based on $t_n'$, the next point $t_{n+1}'$ is determined. In FIG. 4, ● is used for points actually used in the analysis, while ○ is used for points abandoned due to the problem.

As shown in FIG. 3, prior to analysis, decrement α, a reference value Δt for maintaining calculation accuracy, and a reference value Δv for advancing the calculation points are predetermined. A later-used repetition parameter r is dnilled (S10). Defaults can be used for α, Δt, and Δv, or can be specified by a user by inputting them.

After the analysis began, the transient analysis device 1 reads, from the input data storage unit 2, data about a circuit status, circuit elements, an initial status of the circuit, and time of analysis start and end. The variable calculation unit 3 is assumed to calculate the voltage $v_n$, for example. The position of the calculation point $t_n$ is already known approximately on an extension of a line L1 which connects $P_{n-2}$ and $P_{n-1}$, as a point where corresponding $v_n$ satisfies $v_n - v_{n-1} = \Delta v$. The variable calculation unit 3 first examines whether or not $t_n$ already reached $t_{end}$ which is an end time of the analysis (S11). If $t_n$ has already reached $t_{end}$, then the analysis ends through Y of S11. If $t_n$ has not reached $t_{end}$, the procedure moves to S12, and $v_n$ is determined by solving a circuit equation (S12). $P_n$ in FIG. 4 is corresponding to $v_n$ obtained through the procedure as described above.

The next-point assuming unit 4 assumes the position of a calculation point $t_{n+1}$(S13). This point $t_{n+1}$ is assumed to be on an extension of a line L2 which connects $P_{n-1}$ and $P_n$, and also determined so that $v_{n+1}$ approximately satisfies $V_{n+1} - v_n = \Delta v$. The domain judging unit 5 then judges whether $T1 = t_{n+1} - t_n$ is appropriate (S14). If T1 is determined to be not appropriate, because, for example, it falls below the lower bound of the dynamic range, the procedure continues on to S16. In S16, the point adjusting unit 6 adjusts the position of the calculation point $t_n$. In FIG. 4, $t_n$ is moved backward by α to make $t_n'$. When the voltage $V_n'$ corresponding to $t_n'$ is newly calculated, consideration should be given to the difference between the calculation points $t_n'$ and the immediately preceding calculation point $t_{n-1}$. If T2, which is $t_n' - t_{n-1}$, is not appropriate, a forced quit error will occur. Therefore, the domain judging unit 5 judges T2 (S17). In FIG. 4, T2 is decided to be appropriate, and the procedure goes back to S11. Therefore, the voltage $v_n'$ is calculated (S12), and $P_n'$ is plotted in FIG. 4. The next-point assuming unit 4 assumes a position of a following calculation point $t_{n+1}'$ (S13). This calculation point $t_{n+1}'$ is assumed to be on an extension of a line L3 connecting $P_{n-1}$ and $P_n'$, and also determined so that $v_{n+1}'$ approximately satisfies $v_{n+1}' - v_n' = \Delta v$. The domain judging unit 5 judges whether or not T3, which is $t_{n+1}' - t_n'$, is appropriate (S14). In an example of T3 judged to be appropriate because it falls within the dynamic range, if $t_{n+1}' - t_n' > \Delta t$, then $t_{n+1}$, is substituted by $t_n' + \Delta t$, and the procedure goes on to S15. In S15, n is increased by 1, and the procedure goes back to S11. Hereafter, positions of calculation points $t_{n+1}'$, $t_{n+2}'$, . . . are calculated until a calculation point reaches $t_{end}$.

Now take an example that the result in step S16 is judged to be not appropriate in S17. In this case, the procedure goes on to S18, and n is decreased by 1 while r is increased by 1. A judgment whether r has reached $r_{max}$, which is a predetermined repetition maximum, is made (S19). If r has reached $r_{max}$, then the entire procedure ends (Y of S19). If r has not reached $r_{max}$, then the procedure goes back to S16 and the immediately preceding calculation point is moved backward by α. Hereafter, each calculation point is sequentially moved backward until neighboring calculation points are decided to have an appropriate interval, or until the repetition r reaches $r_{max}$. Progress of the analysis can be shown if desired on the display 11 through the display control unit 10. When the analysis ends, the analysis result is moved from the analysis result temporary storage unit 8 to the analysis result storage unit 9.

Modifications of the above described embodiment, including but not limited to the ones below, are possible. First, α can be set negative depending on a situation. For example, with an initially set α, if an analysis was forced to quit through Y of S19 in FIG. 3, α can be changed to negative. In this way, cases of a time step being too short are avoided and forced quit errors will not occur. As another modification of α, it is possible to change α, which was initially set positive, to another positive value. For example, k in $(t_{n+1} - t_n)/k$ can be variable. If α is changed, a message regarding this change may be displayed. Other configurations of the transient analysis device are also possible. For example, the transient analysis device 1, the input data storage unit 2, and the analysis result storage unit 9, which are configured individually in this embodiment, can be unified as a transient analysis device. On the contrary, the analysis data temporary storage unit 8 and the point data storage unit 7 can be placed outside the transient analysis device.

While there has been described what is at present considered to be a preferred embodiment of the invention, it will be understood that various modifications can be made thereto, and it is intended that the appended claims cover all such modifications as fall within the true spirit and scope of the invention.

What is claimed is:

1. A transient analysis method during circuit simulation that prevents an occurrence of a forced quit error due to a time step falling outside a domain treatable by a computer, said method comprising the steps of:

calculating, via a processor, a predetermined variable at a calculation point $t_n$ on a time axis;

determining a next calculation point $t_{n+1}$ by predicting a change in the variable based on the values of the variable prior to and at $t_n$;

judging whether a time step $(t_{n+1}-t_n)$, which is a time step between the calculation points $t_{n+1}$ and $t_n$, falls within a domain treatable by a computer; and adjusting the position of a previously set calculation point when the time step was judged not to fall within the domain;

wherein upon adjustment of the calculation point, each step described above is performed again, and a value of the variable at the calculation point $t_{n+1}$ is then calculated so as to avoid the error, and wherein each step described above is performed on a computer.

2. The method as claimed in claim 1, wherein the assuming step substitutes $t_{n+1}$ by $t_{n+1}=t_n+\Delta t$ when $t_{n+1}-t_n>\Delta t$, with $\Delta t$ being a reference value for maintaining calculation accuracy, and the judging step determines, before judgment, the domain such that a difference between $\Delta t$ and $t_{n+1}-t_n$ falls within a predetermined range.

3. The method as claimed in claim 1, wherein a newly obtained calculation point $t_n$ is used in the calculating step, after the calculation point $t_n$ was moved by a predetermined decrement in the adjusting step.

4. The method as claimed in claim 3 wherein the predetermined decrement is the lower bound of the domain.

5. The method as claimed in claim 3 wherein the predetermined decrement is $(t_{n+1}-t_n)/k$, with k being a natural number.

6. The method as claimed in claim 3 wherein after movement of the calculation point $t_n$, a calculation point $t_{n-1}$ is moved if a time step $(t_n-t_{n-1})$ does not fall within the domain treatable by the computer, and thereafter, calculation points are sequentially moved until a time step between one calculation point and a calculation point immediately preceding the calculation point falls with the domain.

7. The method as claimed in claim 1 wherein the time step is assumed by calculating a change rate in the variable based on a difference between the values of the variable at calculation points $t_{n-1}$ and $t_n$, and then by temporarily setting a position of the calculation point $t_{n+1}$ so that a difference between the values of the variable at calculation points $t_n$ and $t_{n+1}$ coincides with a reference value for advancing calculation point, assuming that the change rate in the variable is constant.

8. The method as claimed in claim 1 further comprising a step of notifying a user of an adjustment of a calculation point when the adjustment is carried out.

9. A transient analysis device for circuit simulation that prevents an occurrence of a forced quit error due to a time step falling outside a domain treatable by a computer, said device comprising:

a section for calculating a value of a predetermined variable at a calculation point $t_n$, said section for calculating comprising a processor;

a section for determining a position of a following calculation point $t_{n+1}$ by predicting a change in the variable using values of the variable at calculation points prior to the calculation point $t_n$;

a section for judging whether a time step between the calculation points $t_n$ and $t_{n+1}$ falls within a domain treatable by a computer; and a section for adjusting a previously set position of a calculation point if the time step is judged not to fall within the domain;

wherein after the calculation point is adjusted, the procedure at each section described above is performed again, and a value of the variable at the calculation point $t_{n+1}$ is then calculated by the calculating section so as to avoid the error.

10. The device as described in claim 9, wherein the assuming section assumes a position of the calculation point $t_{n+1}$ so that a difference between the values of the variable at calculation points $t_n$ and $t_{n+1}$ coincides with a reference value for advancing the calculation point, by calculating a change rate in the variable based on the calculated values of the variable at calculation points $t_{n-1}$ and $t_n$.

11. The device as described in claim 9, further comprising a section for notifying a user of adjustment of calculation point when the position of the calculation point is adjusted.

12. The transient analysis device as claimed in claim 9, wherein the assuming section decides $t_{n+1}=t_n+\Delta t$, with $\Delta t$ being a reference value for maintaining calculation accuracy, when $t_{n+1}-t_n>\Delta t$, and the judging section decides, in advance, the domain so that a difference between $\Delta t$ and $t_{n+1}-t_n$ falls within a predetermined range.

13. The device as claimed in claim 9, wherein in the adjusting section, the position of the calculation point $t_n$ is moved by a predetermined decrement.

14. The device as claimed in claim 9, wherein the predetermined decrement is a lower bound of the domain.

15. The device as claimed in claim 9, wherein the predetermined decrement is decided by $(t_{n+1}-t_n)/k$, with k being a natural number.

16. A transient analysis method during circuit simulation that prevents an occurrence of a forced quit error due to a time step falling outside a domain treatable by a computer, said method comprising the steps of:

sequentially calculating, via a processor, values of a predetermined variable at a plurality of calculation points set on a time axis, where a next calculation point following a calculation point is predicted based on behavior of the predetermined variable;

determining at each calculation whether or not a time step between the calculation point and the next calculation point falls within a domain treatable by a computer; and recalculating the predetermined variable via said processor, in those situations where the time step falls outside the domain treatable by a computer, after adjusting a previously set calculation point so as to avoid the error.

* * * * *